Feb. 25, 1964  B. KARLOVITZ  3,122,212
METHOD AND APPARATUS FOR THE DRILLING OF ROCK
Original Filed June 7, 1960
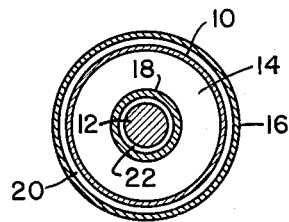
Fig. 2
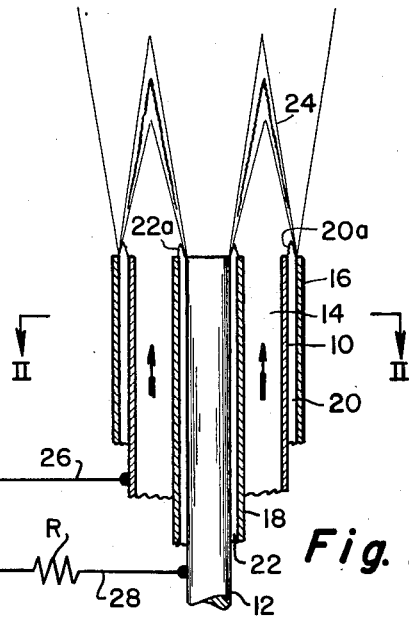
Fig. 1
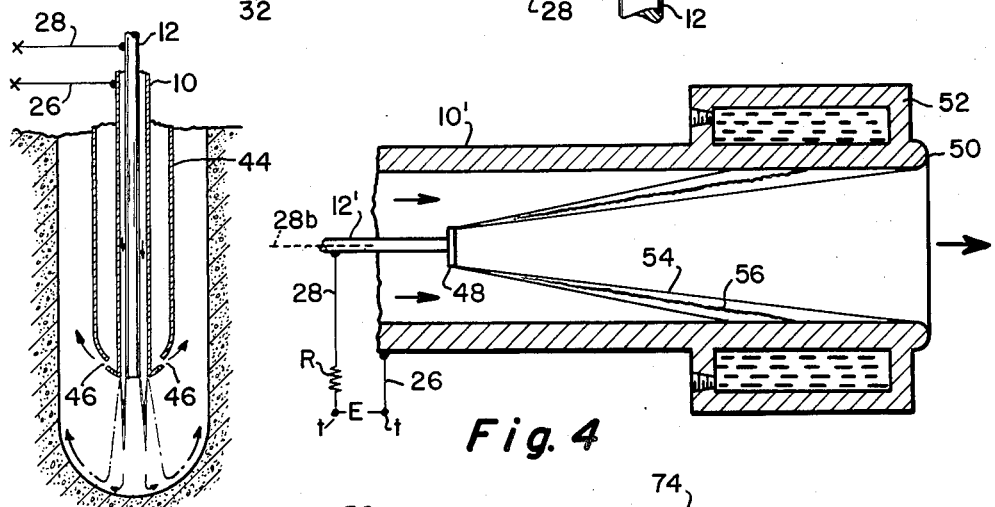
Fig. 3
Fig. 4
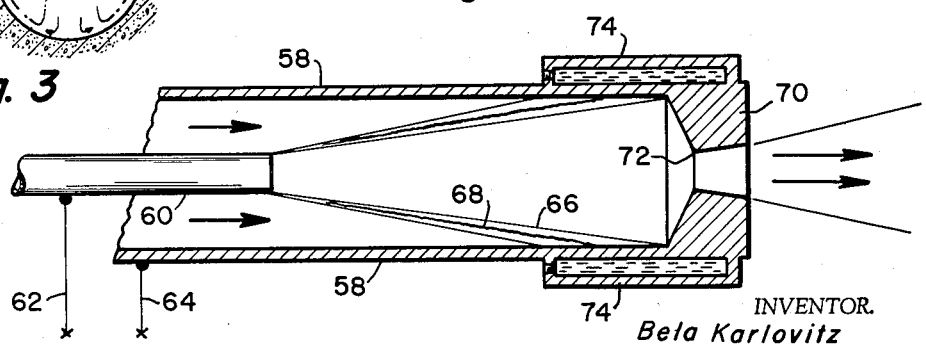
Fig. 5
INVENTOR.
Bela Karlovitz
BY
HIS ATTORNEYS United States Patent Office 3,122,212
Patented Feb. 25, 1964

3,122,212
METHOD AND APPARATUS FOR THE DRILLING OF ROCK
Bela Karlovitz, Pittsburgh, Pa., assignor, by mesne assignments, to Northern Natural Gas Company, Omaha, Nebr., a corporation of Delaware
Original application June 7, 1960, Ser. No. 34,590, now Patent No. 3,004,137, dated Oct. 10, 1961. Divided and this application Oct. 3, 1961, Ser. No. 142,720
7 Claims. (Cl. 175—14)

This application is a division of my application Serial No. 34,590 filed June 7, 1960, as a continuation-in-part application of my then copending application Serial No. 663,065, filed June 3, 1957, now abandoned. My application Serial No. 34,590 has issued as Patent No. 3,004,137. The patent is directed primarily to inventions relating to method and apparatus for the production of high gas temperatures. The high gas temperatures produced by those inventions are useful in the drilling of rock and this application is directed to that subject-matter which is also described in said patent.

The inventions described and claimed in my application Serial No. 34,590 relate to the burning of ordinary fuels, such as air-fuel mixtures, and superimposing on the flame a substantial electrical discharge to further heat the products of combustion. This addition of electrical heating energy to a hot flame readily elevates it to a working level ranging essentially between the exceedingly high operating temperature of an electric arc, on the one hand, and the ordinary air-fuel flame on the other, this temperature range being otherwise an expensive one to operate within by known methods, such as burning premium fuels like hydrogen or acetylene or by oxygen enrichment of the combustion air, or is not obtainable at all without the use of electric arcs.

In general, my inventions use inexpensive fuels which, in the burning stage,, produce temperatures reaching roughly 2000° K or above, and then a relatively high voltage, low current distributed discharge is introduced utilizing electric power as the second stage to reach the high temperature desired, as is more fully explained in Patent No. 3,004,137.

As stated, this application is directed to method and apparatus whereby the high temperatures produced in accordance with said inventions are used in the drilling of rock.

In the accompanying drawings, certain presently preferred embodiments of the inventions are shown, in which:

FIGURE 1 is a fragmentary longitudinal sectional view which is partially schematic and illustrates apparatus which may be used in apparatus for drilling rock in accordance with my inventions;

FIGURE 2 is a transverse section taken along the lines II—II of FIGURE 1;

FIGURE 3 is a diagrammatic showing of apparatus for drilling rock;

FIGURE 4 corresponds to FIGURE 1 and shows a modified form of apparatus; and

FIGURE 5 corresponds to FIGURE 1 which shows a still further modified form of apparatus.

Referring to FIGURES 1 and 2, my burner has a casing or burner tube 10 forming an outer electrode and containing a concentric center electrode 12. The electrodes 10 and 12 are spaced apart to define an annular gas flow channel 14 adapted to carry an explosive mixture composed, for example, of air and an ordinary hydrocarbon fuel.

An outside sleeve 16 and an inside sleeve 18 closely fit the respective electrode members to provide an annular gas passage 20 surrounding the main channel 14 and another annular gas passage 22. The gas passages 20 and 22 terminate at the rim of the burner to supply a pair of annular pilot flames 20a and 22a which may be used to stabilize an annular wedge-shaped flame brush 24 when the velocity of the gases requires it.

An electrical power circuit comprises a lead 26 which may be grounded and is connected to the burner tube electrode 10 and a lead 28 connected to the center electrode 12.

I impress either A.C. or D.C. voltage on the electrodes 10 and 12 to add electrical heating current to the flame and FIGURE 1 is illustrative of one way of using A.C. power. An input circuit 30, including the secondary winding of a step-up transformer 32, is connected to supply alternating current to the electrode lead wires 26 and 28.

Because of the high temperatures developed in flames in accordance with my inventions and because of the excellent heat transfer properties of the products of combustion of these flames due to the recombination of disassociated molecules at lower temperatures, the flames can rapidly melt any material present in the earth's crust. Therefore, these flames are well suited for the production of deep wells. In FIGURE 3, I have illustrated diagrammatically apparatus whereby my inventions can be used for such a purpose. One or more burners, such as the one shown in FIGURE 1, is mounted in a drill tube 44, one only being shown in FIGURE 3 for simplicity of illustration.

In the burner, a combustible mixture is fed through a tube 10 which surrounds an electrode 12, as explained in connection with the description of the structure shown in FIGURE 1. A high voltage is applied between the electrode 12 and the tube 10 by the leads 26 and 28. The flame is stabilized by annular pilot flames (not shown in FIGURE 3) which are the same as the pilot flames 20a and 22a in FIGURE 1. Since the flame is stabilized by the annular pilot flames, the flow velocity of the gases may be very high, in the order of several hundred feet per second.

A high velocity, high temperature flame impinges on the bottom of the well where it is deflected and forms a thin sheet of hot blast which sweeps across the rock surface to be melted away. Because of the high flow velocity and resulting high turbulence, the relatively short distance between the stream of hot gases and the rock and the high degree of disassociation of the products of combustion, the rate of transfer of heat to the rock is very high and heat loss from conduction in the rock constitutes only a small fraction of the heat supplied. The molten material is swept out from the bottom of the hole by the high velocity blast and may be broken up into small droplets and carried to the surface by auxiliary air streams supplied through ports 46 adjacent the bottom of the drill pipe and opening upwardly. Alternatively, the top layer of the rock exposed to the flame may spall due to sudden expansion. The blast breaks up the spalled layer into chips which are carried by the blast and the auxiliary air streams.

However, in rock drilling, a high gas flow rate is important and, therefore, I prefer a modified burner, such as is shown in FIGURE 4, which produces a particularly high, burned-gas velocity. In this high velocity burner, two circuit leads 28 and 26 are fed from an electrical source in the preceding manner and these leads are respectively connected to a center electrode 12' within the burner and to an outside electrode 10' forming the burner tube. In the specific application to well drilling purposes, the lead 12' to the center electrode is preferably arranged as an insulated coaxial conductor indicated by the dotted lines 28b, and the outer electrode 10' constitutes the ground electrode. This conductor 28b will be attached to the inner end of the center electrode 12' which has an enlargement at the opposite end forming a disk-shaped flame holder 48 which is both radially offset within the outer electrode 10' and axially inwardly offset from the rim 50 thereof. A liquid-filled cooling jacket 52 surrounds the burner tube in the vicinity of the burner tip 50 and suitable means is provided for circulating liquid coolant through that jacket while the burner is in operation. The flame holder 48 stabilizes the flame brush shown at 54 which is fed by an explosive air-fuel mixture flowing in the direction of the arrows to the right, as viewed in FIGURE 4. The potential difference existing between the electrodes 10' and 12' causes a distributed discharge to form in the cone-shaped volume bounded by the combusion wave indicated by the wavy line 56.

The tube 10' has a uniform inside diameter and, therefore, the hot combustion products are confined in the same cross-sectional area as the unburned gases. The volume of the gases increases many-fold as they burn and the amount of their expansion forces them to accelerate and flow at a high rate. Consequently, feeding the unburned gas to the burner at an initially high flow rate will produce very high burned-gas velocities to reach at least approximately the speed of sound.

In connection with the burners shown in FIGURES 1 and 4, I have described flames formed from premixed explosive mixtures. These burners may also be employed with diffusion flames, in which case fuel gas only is supplied to the tubes 10 and 10'.

In certain instances in drilling rock, it may be desirable to use a concentrated stream of gases at high temperatures and flowing at supersonic velocities. FIGURE 5 shows apparatus which can be incorporated in the drill tube 44 to produce a concentrated stream of high temperature gases which flows at supersonic velocities.

The apparatus shown in FIGURE 5 includes a tube 58 which serves as the outer electrode and through which an explosive air-fuel mixture flows from the left towards the right as indicated by the arrows in FIGURE 5. The apparatus also includes a flame holder 60 which also acts as an electrode. The electrode 60 is spaced centrally in the tube 58 and is spaced axially within the tube a considerable distance upstream from the end of the tube from which the hot gases flow. The space within the tube 58 between the end of the flame holder 60 and the jet nozzle 70 forms a combustion chamber in which substantially all of the explosive air-fuel mixture is burned. The size of this chamber varies in accordance with a number of factors, all of which are known to those skilled in the art, such as the rate of flow of the gases, the pressure under which they are flowing, the nature of the mixture, and the pressure at which combustion is accomplished. In general, the distance between the flame holder 60 and the jet nozzle 70 will be at least twice the internal diameter of the tube 58.

The apparatus of FIGURE 5 also includes conventional means (not shown in FIGURE 5) for supplying the explosive air-fuel mixture into the tube 58 at elevated pressure. The actual pressure in the combustion chamber is determined by the desired velocity of the stream of hot gas as it leaves the burner. The relationship between pressure in the combustion chamber and exit velocity is well known.

Two leads 62 and 64 connected to an electrical source in the same manner as the embodiments previously described create a potential difference between the electrodes 58 and 60.

A flame is formed at the end of the flame holder 60 which creates a flame brush indicated by the line 66 in FIGURE 5. The potential difference existing between the electrodes 58 and 60 causes a distributed discharge to form in the cone-shaped volume bounded by the combustion wave indicated by the wavy line 68. A jet nozzle 70 is placed in the end of the tube 58 from which the hot gases flow. The nozzle 70 restricts the end of the tube 58 so that all of the products of combustion of the air-fuel mixture flow through the throat 72 of the nozzle at increased velocities.

A liquid-filled cooling jacket 74 surrounds the tube 58 in the vicinity of the jet nozzle 70 and suitable means is provided for circulating liquid coolant through that jacket while the burner is in operation.

While I have described certain presently preferred embodiments of my inventions, it is to be understood that they may be otherwise variously embodied within the scope of the appended claims.

I claim:

1. A method of rock drilling which comprises forming an explosive mixture of gases flowing in a stream at elevated pressure, creating a strong turbulence in the stream, forming a flame in the turbulent stream by chemical combustion, establishing a substantial electrical discharge distributed across the flame, passing substantially all of the stream of combustion gas through the discharge to increase the temperature of said stream and directing it against the rock to be drilled.

2. A method of rock drilling which comprises forming an explosive mixture of gases flowing in a stream at elevated pressure, creating a strong turbulence in that stream, forming a flame in the turbulent stream by chemical combustion, establishing a substantial electrical discharge distributed across the flame, passing substantially all of the stream of combustion gas through the discharge to increase the temperature of said stream, increasing the velocity of said heated stream of combustion gas by passing it through a jet nozzle and directing the stream against the rock to be drilled.

3. A method of rock drilling which comprises producing a high velocity stream of high temperature gas which comprises creating a stream of a combustible mixture under elevated pressure, forming a flame by chemical combustion in the stream, establishing a substantial electrical discharge distributed across the flame, passing substantially all of the stream of combustion gas through the discharge to increase the temperature of the stream, passing the heated stream through a jet nozzle and directing the stream against the rock to be drilled.

4. Apparatus for drilling rock comprising a drill tube and at least one burner within said tube, said burner comprising a burner tube, a flame holder positioned centrally within the burner tube and defining with the burner tube an annular chamber for the flow of gas to support a flame within the burner tube, means for supplying a flow of combustible gas mixture through said annular chamber, said flame holder being axially spaced inwardly from an open end of the burner tube, the open end of said burner tube having a cross-sectional area at least equal to the cross-sectional area of the portion of the burner tube opposite to the flame holder, and means for creating an electrical discharge between the burner tube and the flame holder.

5. Apparatus for drilling rock comprising a drill tube and at least one burner within said tube, said burner comprising a burner tube, a flame holder positioned centrally within the burner tube and defining with the burner tube an annular chamber for the flow of an explosive gas mixture to support a flame within the burner tube, means for supplying a flow of combustible gas mixture through said annular chamber at elevated pressures, a jet nozzle at the end of the burner tube from which the high temperature gas stream flows, said jet nozzle restricting the cross-section of the end of the burner tube and having a jet throat therein through which the high temperature gas flows out of the burner tube, said flame holder being axially spaced upstream from said throat to form a combustion chamber of sufficient volume to burn substantially all of the explosive mixture within the chamber, and means for creating a substantial electrical discharge between the burner tube and the flame holder.

6. Apparatus for drilling rock comprising a drill tube and at least one burner at the end of the tube which is placed adjacent the rock to be drilled, said burner having a burner tube for creating a flame by chemical combustion in a gas stream and means for establishing a substantially electrical discharge distributed across the flame, said means being positioned relative to the flame whereby substantially all of the combustion gas passes through said discharge and is heated by said discharge and impinges on the rock to be drilled.

7. Apparatus for drilling rock as described in claim 6 in which said drill tube has means for creating an air stream which flows upwardly around the drill tube to carry melted rock particles upwardly to the surface of the rock being drilled.

References Cited in the file of this patent
UNITED STATES PATENTS 2,742,555    Murray _____ Apr. 17, 1956

FOREIGN PATENTS 147,729    Switzerland _____ Sept. 1, 1931